United States Patent [19]
Torrington et al.

[11] 3,940,148
[45] Feb. 24, 1976

[54] LID INTERLOCK APPARATUS FOR DISC RECORD PLAYER

[75] Inventors: Leslie Albert Torrington; Ronald Ray Oberle, both of Indianapolis, Ind.

[73] Assignee: RCA Corporation, New York, N.Y.

[22] Filed: Jan. 30, 1975

[21] Appl. No.: 545,406

[30] Foreign Application Priority Data
Nov. 18, 1974 United Kingdom.............. 49927/74

[52] U.S. Cl. .............. 274/1 R; 178/6.6 DD; 360/86
[51] Int. Cl.².. G11B 1/00; G11B 5/012; H04N 1/00
[58] Field of Search........ 274/1 R, 1 G, 1 D, 2, 9 B; 360/86; 178/6.6 DD

[56] References Cited
UNITED STATES PATENTS

| | | | |
|---|---|---|---|
| 3,254,896 | 6/1966 | Dennis............................ | 274/10 R |
| 3,593,327 | 7/1971 | Shill..................................... | 360/97 |
| 3,716,240 | 2/1973 | Freeman................................ | 274/2 |
| 3,789,273 | 1/1974 | O'Brian................................ | 360/97 |
| 3,803,351 | 4/1974 | Pederson et al. .................... | 274/1 D |
| 3,886,592 | 5/1975 | Kata et al. .............................. | 274/2 |

FOREIGN PATENTS OR APPLICATIONS

| | | | |
|---|---|---|---|
| 15,036 | 1929 | Australia............................. | 274/1 D |

Primary Examiner—Richard E. Aegerter
Assistant Examiner—Steven L. Stephan
Attorney, Agent, or Firm—Eugene M. Whitacre; William H. Meagher; Dilip A. Kulkarni

[57] ABSTRACT

A lid is hinged to the base of a disc record player for movement between a closed position and an open position. A lid latch member is mounted in the base for (1) securely holding the lid in the closed position, and (2) releasing the lid in response to manipulation of a lid release lever. A cam is mounted in the base for movement between (one) a first condition decoupling, and (two) a second condition intercoupling, the release lever and the latch member. A linkage is provided between the cam and a signal pickup housing of the player for moving the cam (a) into the first condition when the housing is in a playback mode whereat manipulation of the release lever is ineffective to release the lid, and (b) into the second condition when the housing is in a standby mode whereat the latch member responsive to manipulation of the lever releases the lid, if the lid were closed.

9 Claims, 7 Drawing Figures

U.S. Patent  Feb. 24, 1976  Sheet 1 of 5  3,940,148
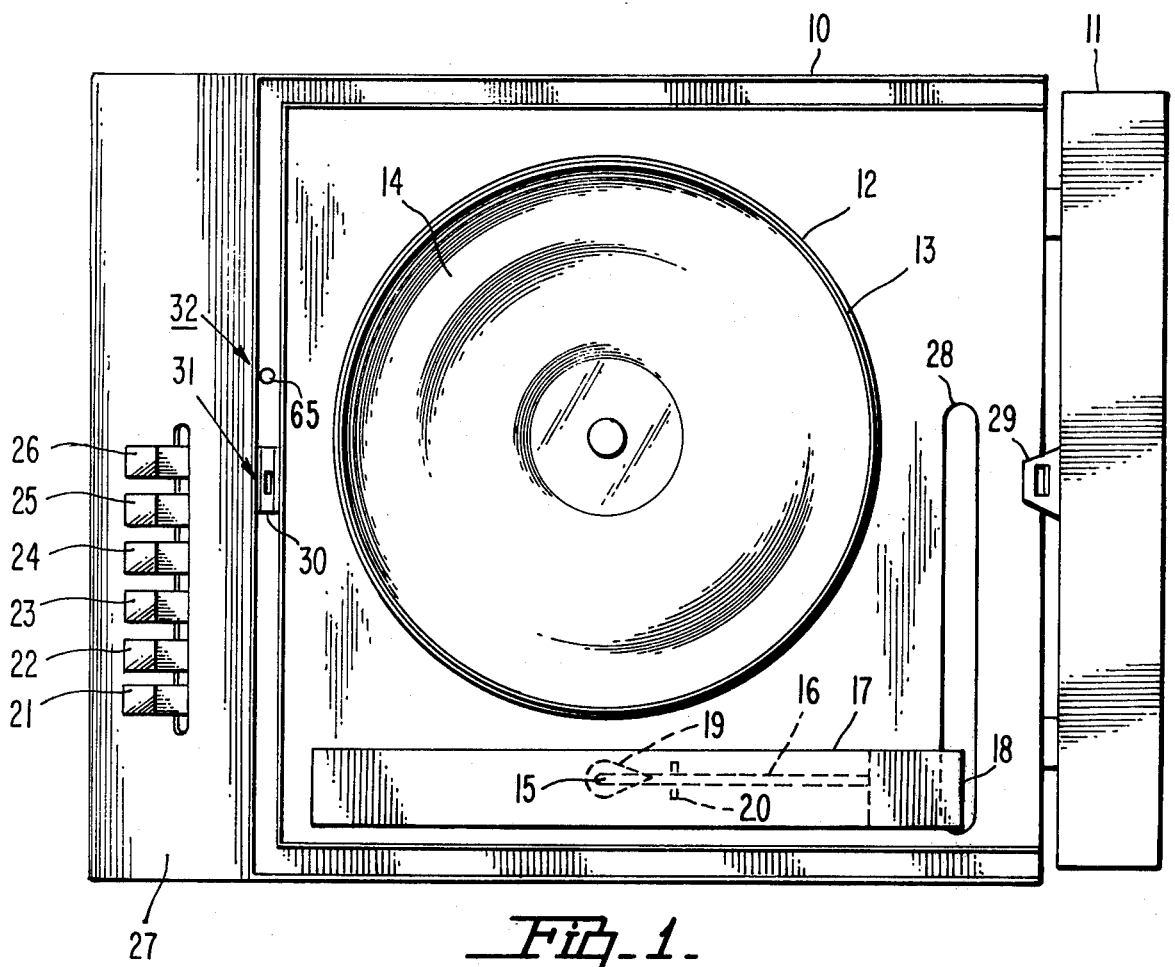
Fig_1_
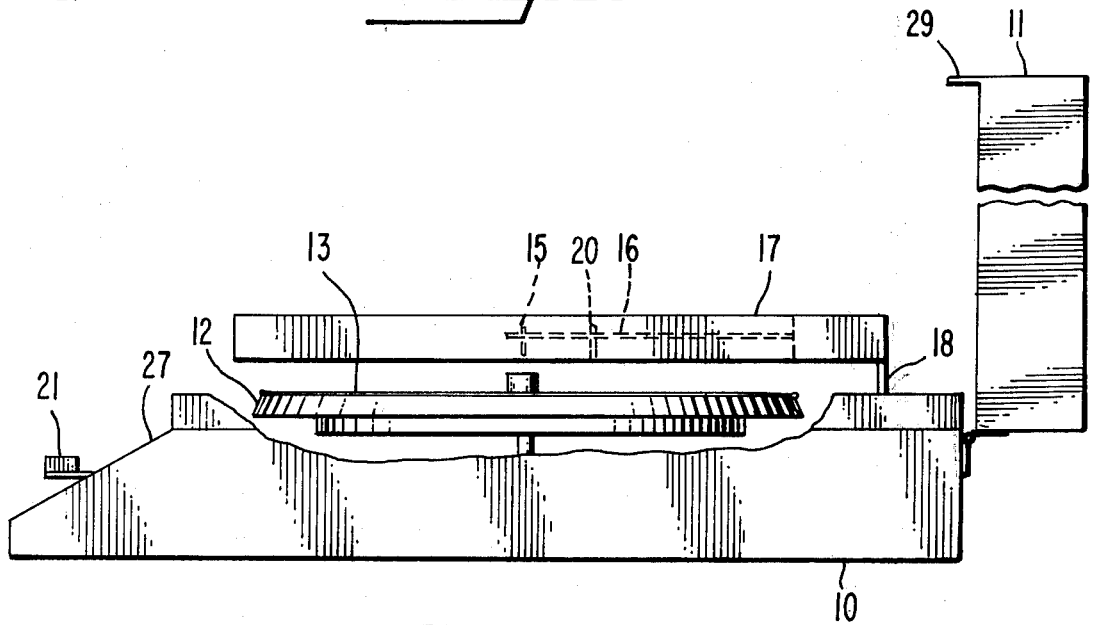
Fig_2_

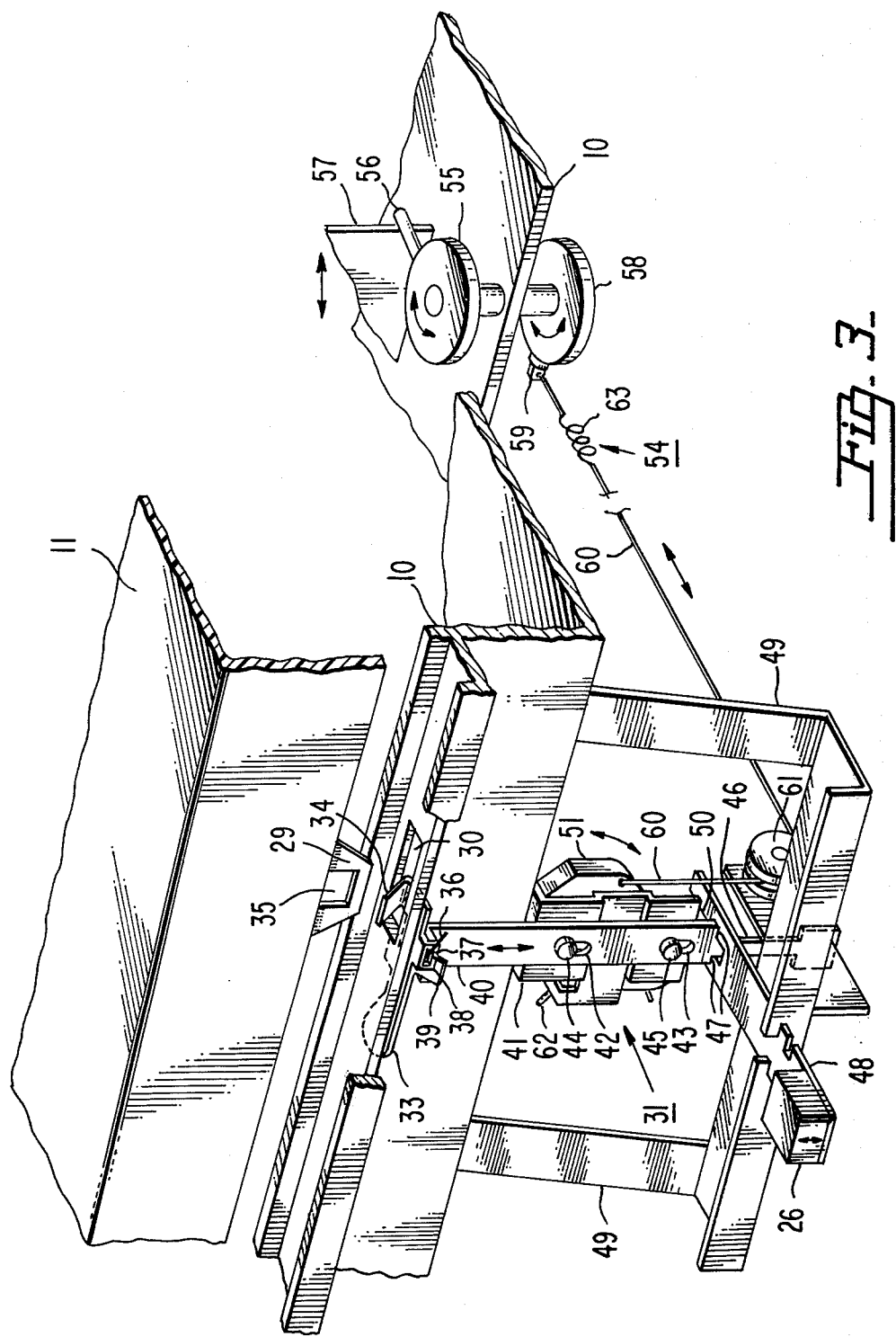

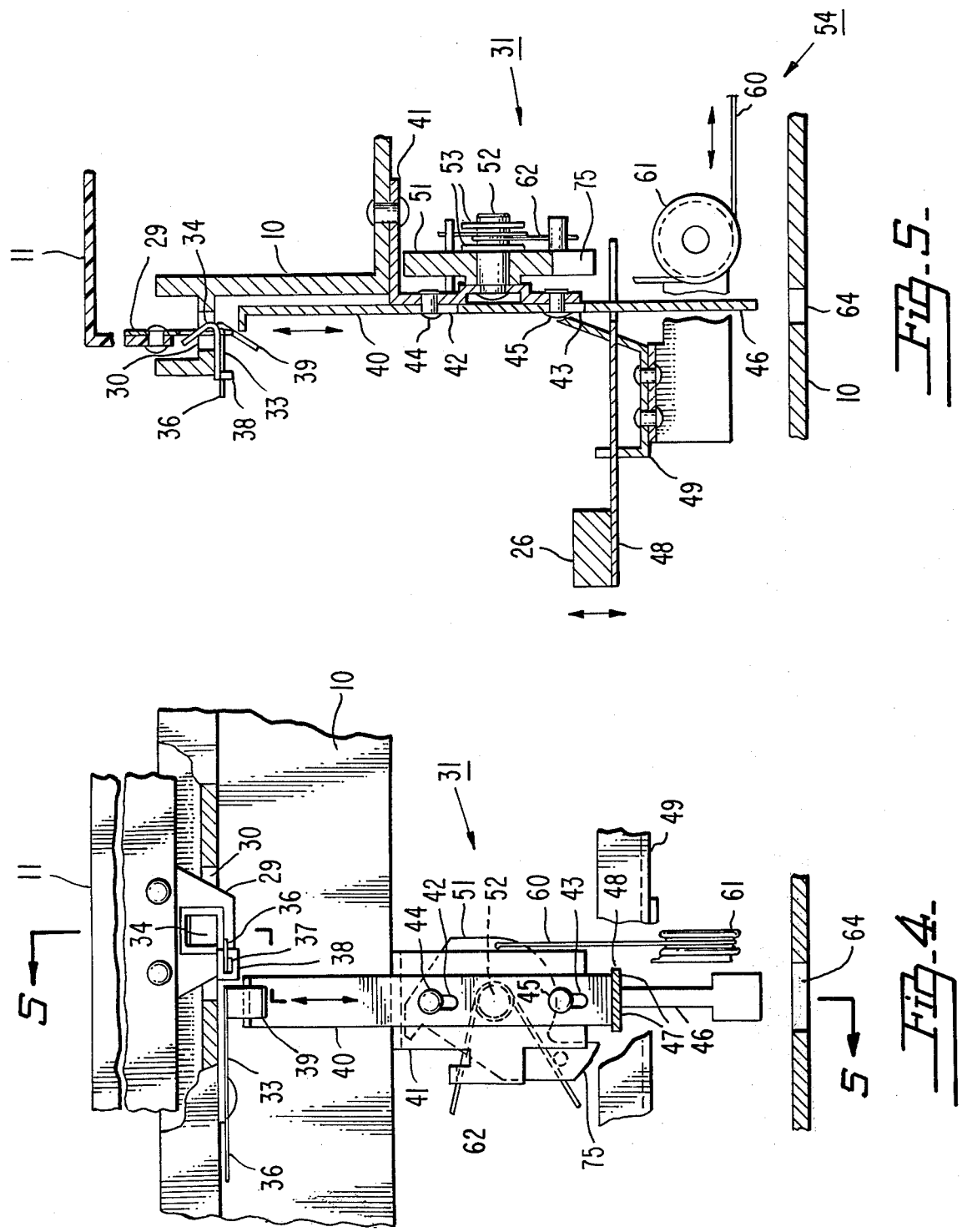

LID INTERLOCK APPARATUS FOR A DISC RECORD PLAYER

The present invention relates to disc record player systems, and more particularly relates to a lid interlock apparatus for preventing opening of the player lid during playback.

BACKGROUND OF THE INVENTION

In certain video disc systems, video information is recorded by means of geometric variations in the bottom of a smooth spiral groove on the surface of a disc record. The disc record surface includes a coating of conductive material which is preferably covered with a thin deposit of dielectric material. A signal pickup, supported at one end of a pickup arm, engages the spiral groove and includes a conductive electrode which establishes a capacitance with the conductive coating and the dielectric deposit of the disc record. When the disc record is rotated, the electrodedisc capacitance varies in response to the geometric variations in the bottom of the spiral groove passing beneath the signal pickup. The capacitance variations are converted to electrical signal variations by a suitable signal processing circuitry coupled to the pickup electrode. The output signal of the signal processing circuitry may be coupled to a conventional television receiver for reproduction. The pickup arm is mounted within a signal pickup housing of the playback system. A system of the aforementioned type is described in detail in U.S. Pat. No. 3,842,194, issued on Oct. 15, 1974 to Jon K. Clemens.

Video disc systems of the aforementioned type generally utilize disc records having groove densities in the order of four to eight thousand groove convolutions per inch. A typical video disc record of this type may have a groove convolution spacing in the order of 3.5 microns. The fragile walls of relatively narrow grooves of the disc record cannot be dependably relied upon to pull the pickup arm assembly, around the pickup arm pivot support, across the entire recorded surface of the disc record. Also, in video disc systems utilizing the variable capacitor concept, it is desirable for accurate reproduction of the prerecorded signals that the signal pickup electrode maintain a substantially constant attitude in the spiral groove. Therefore, a radial feed drive mechanism is provided for traversing the signal pickup housing in proper time relationship with the radial motion of the signal pickup tip engaged in the spiral groove so as to continuously maintain the longitudinal axis of the pickup arm substantially tangential to the spiral groove at the point of engagement when the player is in a playback mode. Reference may be made to the copending U.S. application of F. R. Stave, Ser. No. 351,600, filed Apr. 16, 1973, now U.S. Pat. No. 3,870,835 and entitled VIDEO DISC PLAYBACK APPARATUS for an illustration of a suitable radial feed drive mechanism for providing the indicated radial motion.

Further, in the aforesaid video disc systems, adequate bandwidth for monochrome and color display is obtained by rotating the disc at a speed substantially higher (e.g., 450 rpm) than the conventional audio playback speeds (e.g., 33⅓ rpm).

Additionally, in the above-mentioned video disc systems, groove engaging and low mass requirements of a signal pickup assembly result in a pickup arm unit which is extremely fragile (e.g., signal pickup width 2 microns, signal pickup depth 5 microns, signal pickup electrode width 2 microns, and signal pickup electrode depth 0.2 microns).

In the playback systems of the aforementioned type the following considerations may be encountered. First, it is desirable to prevent opening of the lid when the signal pickup housing is in the playback mode in order to protect the fragile signal pickup assembly of the player.

Second, it is advantageous to brake the turntable when the lid is opened while the turntable is rotating at relatively high speed (e.g., 450 rpm) in order to reduce safety hazard to the player user.

Third, it may be preferably to preclude opening of the lid until the signal pickup housing has cleared the disc record so that the record just played may be removed for changing side, or placing a new disc record on the turntable without hindrance.

SUMMARY OF THE INVENTION

Pursuant to an illustrative embodiment of the present invention, a lid is pivoted to the base of a disc record player for movement between a closed position and an open position. A lid latch member is mounted on the base for (1) securely holding the lid in the closed position, and (2) releasing the lid in response to manipulation of a lid release lever. Means conditionable between (one) a first condition decoupling, and (two) a second condition intercoupling, the release lever and the latch member is provided. Means interconnecting the conditionable means and a signal pickup housing of the player is effective for conditioning the conditionable means (a) into the first condition when the housing is in a playback mode whereat manipulation of the release lever is ineffective to release the lid, and (b) into the second condition when the housing is in a standby mode whereat the latch member responsive to manipulation of the lever releases the lid, if the lid were closed.

BRIEF DESCRIPTION OF THE DRAWINGS

Objects, features, and advantages of the present invention will be more fully understood from the following detailed description of the preferred embodiment, the appended claims, and the accompanying drawings in which:

FIG. 1 is a plan view of a video disc player incorporating an illustrative embodiment of a lid interlock apparatus according to the present invention, the lid of the player is shown in an open position for clarity;

FIG. 2 is a side view of the video disc player of FIG. 1;

FIG. 3 is a partially cut-away, perspective view of the lid interlock apparatus suitable for use with the player of FIGS. 1 and 2;

FIG. 4 is a front view of a portion of the lid interlock apparatus of FIG. 3;

FIG. 5 is a partially cut-away, sectioned side view of the lid interlock apparatus along the line X—X in FIG. 4;

DETAILED DESCRIPTION OF THE PREFERRED EMBODIMENT

Figure 6:
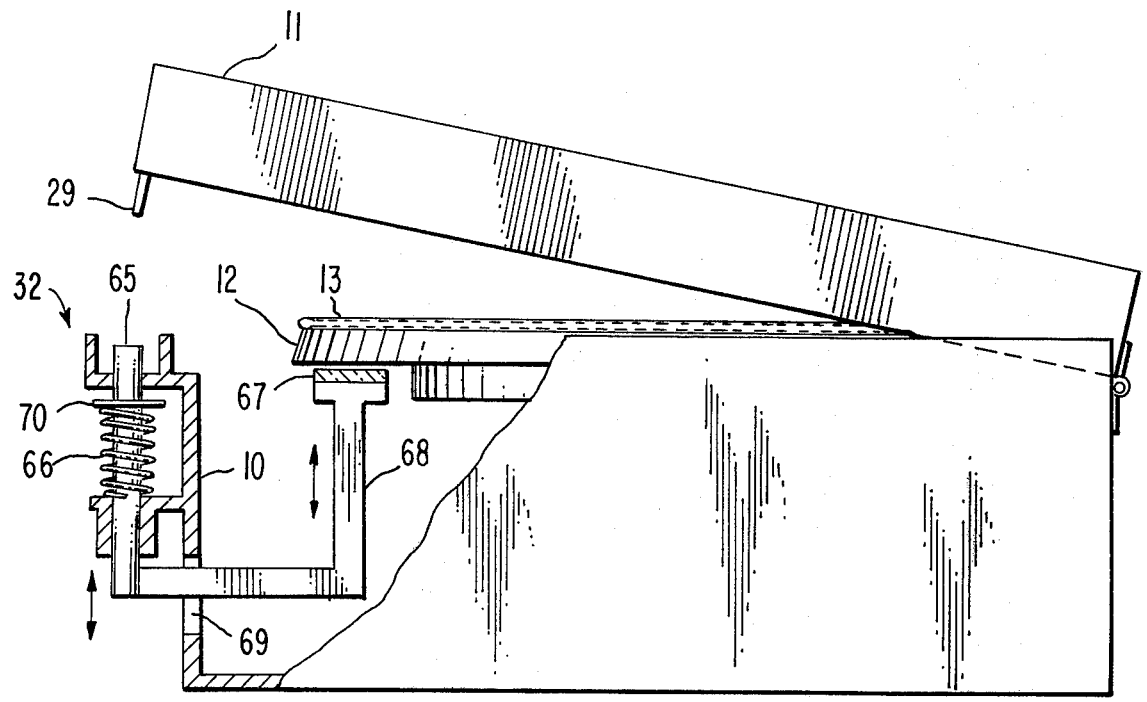
FIG. 6 diagrammatically illustrates a turntable brake mechanism suitable for use with the lid interlock apparatus of FIGS. 3, 4, and 5.

Referring to the drawings, wherein like reference numerals designate similar elements in the various views, in FIGS. 1 and 2 a video disc player is shown having a base 10. A lid 11 is pivoted to the base 10 for movement between a closed position and an open position. The player is suitable for use in a video disc system such as disclosed in the aforementioned Clemens patent. A turntable 12 is rotatably mounted on the base 10. The upper surface of the turntable 12 is adapted to support a video disc record 13. Video information is recorded by means of geometrical variations in the bottom of a smooth spiral groove 14 on the substrate of the disc record 13. The disc record 13 surface includes a conductive coating which is preferably covered with a thin deposit of dielectric material. A signal pickup 15, supported at one end of a conductive pickup arm 16, engages the spiral groove 14 and includes a conductive electrode (not shown) which, together with the conductive coating and the dielectric deposit, form a capacitor. When relative motion is established between the signal pickup 15 and the disc record 13, an edge of the electrode included in the signal pickup, while riding in the spiral groove 14, serves as an electrode of a capacitor varying due to the geometric variations in the bottom of a smooth spiral groove passing beneath. The other end of the pickup arm 16 is flexibly supported by a pickup arm support carried by a signal pickup housing 17.

As indicated before, a radial feed drive mechanism 18 traverses the pickup arm support mounted in signal pickup housing 17 in proper time relationship with the radial motion of the signal pickup 15 tip engaged in the spiral groove 14 so as to continuously maintain the longitudinal axis of the pickup arm substantially tangential to the spiral groove at the point of engagement. A slot 28 is provided in the base 10 for accommodating the radial motion of the housing 17. Reference may be made to the aforementioned copending Stave application (Ser. No. 351,600) for an illustration of a suitable feed drive mechanism for providing the indicated radial motion.

During playback, the pickup arm 16 passes through an opening 19 in the bottom wall of the housing to allow the signal pickup 15 to ride in the spiral groove 14. A pivotally mounted bracket 20 lifts the free end of the pickup arm 16 to disengage the signal pickup 15 from the spiral groove 14 when the player is inoperative.

A plurality of push buttons 21, 22, 23, 24, 25, and 26 are provided along the front panel 27 for, respectively, effecting the following functions: start, pause, reject, fast forward, reverse, and lid release.

A lip 29 is fastened to the lid 11 for entry into an opening 30 provided in the base 10 in order to engage a latch member of a lid interlock apparatus 31 to be described subsequently. A plunger 65 of a turntable brake mechanism 32 is reciprocably mounted in the base 10 for cooperation with the lid 11 in the manner also to be described subsequently.

Reference will now be made to FIGS. 3, 4, and 5. FIG. 3 is a partially cut-away, perspective view of the lid interlock apparatus 31. FIGS. 4 and 5 are, respectively, the front view and a partially sectioned side view of a portion of the lid interlock apparatus of FIG. 3.

A latch member comprises a plate 33 pivotally mounted on the base 10 for movement between (1) a protruding position, and (2) a retracted position. A first tab 34 is secured to the plate 33 for (a) engagement with an aperture 35 provided in the lip 29 of the lid 11 when the plate 33 is in the protruding position, and (b) releasing the lip when the plate is in retracted position, if the lid is closed. A wire spring 36 is inserted into an opening 37 provided in a tab 38 fastened to the plate 33 in a manner that biases the plate in the protruding position. The first tab 34 has a slanting top surface in order to facilitate gradual shifting of the plate 33 to the retracted position by the lip 29 as the lip is inserted into the opening 30 provided in the base 10. The wire spring 36 pushes the first tab 34 into the aperture 35 disposed in the lip 29 thereby securely holding the lid 11 to the base 10. A second tab 39 is secured to the plate 33 for engagement with one end of a slide member 40 reciprocably mounted to a bracket 41 attached to the base 10. Elongated slots 42 and 43 are provided in the slide 40 for cooperation with pins 44 and 45 fastened to the bracket 41 thereby permitting reciprocating movement of the slide with respect to the bracket. The second tab 39 has a slanting bottom surface in order to facilitate gradual movement of the plate 33 against the spring 36 to the retracted position by the one end of the slide 40 as the slide is pushed upward.

The slide 40 has a neck portion 46 at the second end forming a shoulder portion 47 at the second end of the slide. A lid release lever 48, carrying the push button 26, is pivotally mounted on a frame 49 attached to the base 10. An open-ended slot 50 is provided at one end of the lid release lever 48 for freely receiving the neck portion 46 of the slide 40. When the push button 26 is depressed, the lid release lever 48 engages the shoulder portion 47 of the slide pushing the slide upward. The upward motion of the slide causes the plate 33 to retract thereby releasing the lid 11, if the lid were closed. Means are provided for biasing the lid 11 in the open position and the push button 26 in an elevated position.

A cam 51 is pivotally mounted on the bracket 41 by a pin 52 attached to the bracket on the side opposite of the slide 40. A retainer 53 positions the cam 51 on the pin 52. The cam 51 is movable between (1) a first condition decoupling, and (2) a second condition intercoupling, the release lever 48 and the latch member plate 33. Orientation of the cam 51 in the first condition renders the lid release lever 48 immovable because a tounge portion 75 of the cam blocks the manipulation of the lever. Orientation of the cam 51 in the second condition (as illustrated in FIGS. 3, 4, and 5) frees the manipulation of the lever 48.

Means 54 are provided for interconnecting the cam 51 and the housing 17. The radial feed drive 18 drives the housing 17 between a standby mode and the playback mode. The interconnecting means 54 is effective for moving the cam 51 (a) into the first condition when the housing 17 is in the playback mode whereat manipulation of the release lever 48 is ineffective to release the lid 11, and (b) into the second condition when the housing is in the standby mode whereat the latch member responsive to manipulation of the lever releases the lid, if the lid were closed.

Illustratively, the interconnecting means 54 comprises a first hub 55 pivotally mounted in the base 10. A pin 56 is secured to the hub 55 for engagement with a downwardly depending tab 57 coupled to the housing 17. When the housing 17 moves from the playback mode to the standby mode, the tab 57 engages the pin 56 and rotates the hub 55 in clockwise direction when viewed from the top. A second hub 58 is mounted in the base for rotation with the first hub 55. A pin 59 is secured to the second hub 58. A cord 60 interconnects the cam 51 and the pin 59 attached to the hub 58. A pulley 61 is mounted on a bracket attached to the frame 49 of the base 10. The pulley 61 guides the cord 60 such that clockwise rotation of the hubs (55 and 58), as the housing 17 moves from the playback mode to the standby mode, causes the cam 51 to move to the second condition, thereby freeing the lid release lever 48 to operate the latch member for releasing the lid 11.

A wire spring 62 is provided for biasing the cam in the first condition, whereby when the housing 17 is in the playback mode manipulation of the lid release lever 48 is ineffective to release the lid 11.

A safety spring 63 may be inserted in the cord 60 to prevent damage in the event of mechanical failure, such as jamming.

An opening 64 is provided in the base 10, as shown in FIG. 5, for the purpose of releasing the lid 11 by pushing the slide 40 upward, irrespective of the position of the cam 51.

The turntable brake mechanism 32 will now be explained by reference to FIG. 6. A plunger 65 is reciprocably mounted in the base 10 for movement between (1) a first position when the lid 11 is released open, and (2) a second position when the lid is closed, in response to the lid movement. A spring 66 is inserted between a retainer 70, attached to the plunger 65, and the base 10 for biasing the plunger in the first position. A friction pad 67 is secured to the other end of a bracket 68 attached to the plunger 65 for engagement with the underside of the turntable 12 when the plunger is in the first position effecting braking of the turntable when the lid 11 is opened while the turntable is rotating. A slot 69 is cut into the base 10 for permitting reciprocal motion of the bracket 68.

The movement of the plunger 65, when the lid 11 is opened, may be advantageously utilized to cut off power to the turntable drive motor (not shown), thereby further reducing the safety hazard.

Thus, the lid interlock apparatus (1) prevents opening of the lid during playback, and (2) brakes the turntable when the lid is opened while the turntable is rotating at a relatively high speed.

Figure 7:
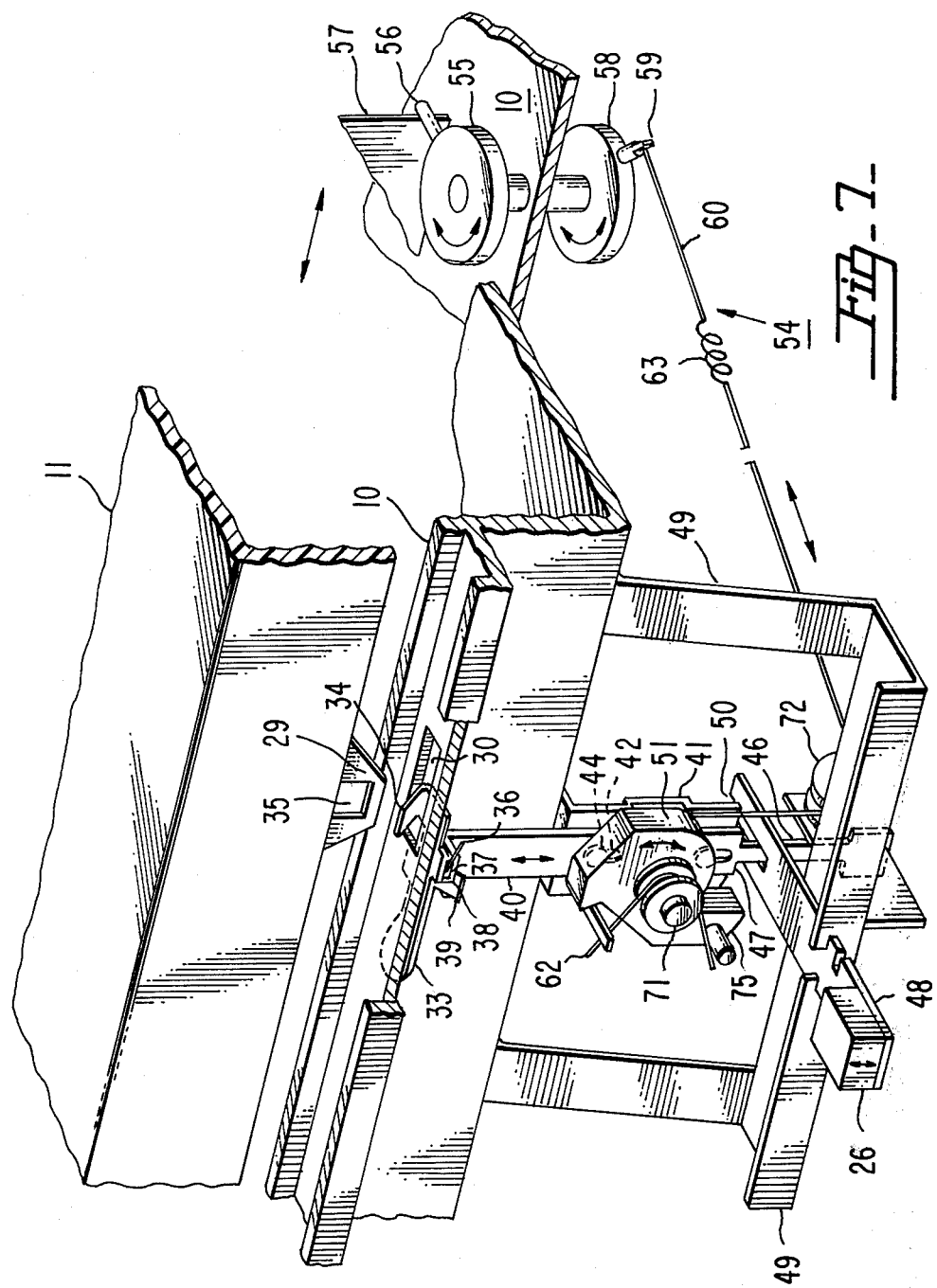
FIG. 7 is a partially cut-away, perspective view of a modified lid interlock apparatus according to another embodiment of the present invention.

FIG. 7 is a partially cut-away, perspective view of a modified interlock apparatus according to another embodiment of the present invention. In the FIG. 7 embodiment the cam 51 is mounted on the reciprocating slide 40 instead of on the fixed bracket 41. The cam 51 is positionable between (1) a first condition intercoupling, and (2) a second condition decoupling (as illustrated in FIG. 7), the release lever 48 and the slide 40. When the cam 51 is in the second condition, the latch member structure does not obstruct movement of the lever 48 as the shoulder portions 47 of the slide 40 do not engage the lever throughout the range of movement of the lever (in contradistinction to arrangement of FIGS. 3, 4, and 5). The reason for the FIG. 7 arrangement is that it protects the lid interlock apparatus from damage in the event of accidental pushing of the lever 48 when the housing 17 is in the playback mode as the lever is now free to move. Interconnecting means is effective for moving the cam 51 (a) into the first condition when the housing 17 is in the standby mode whereat the latch member plate 33 responsive to the movement of the slide member 40 caused by manipulation of the lever 48, via the cam, releases the lid 11, and (b) into the second condition when the housing is in the playback mode whereat manipulation of the release lever is ineffective to release the lid, if the lid were closed.

What is claimed is:

1. In a playback system for recovering prerecorded signals by a signal pickup from a disc record rotatably mounted on a turntable, the playback system including a lid pivoted on a base for movement between a closed position and an open position, and a signal pickup housing reciprocably mounted on the base for travel between a standby mode and a playback mode, a lid interlock apparatus comprising:
   a lid release lever movably mounted on the base;
   lid latch means selectively responsive to manipulation of the release lever for releasably securing the lid;
   means conditionable between (1) a first condition decoupling, and (2) a second condition intercoupling, the release lever and the latch member; and
   means interconnecting the conditionable means and the signal pickup housing, wherein the interconnecting means is effective for conditioning the conditionable means (a) into the first condition when the housing is in the playback mode whereat manipulation of the release lever is ineffective to release the lid, and (b) into the second condition when the housing is in the standby mode whereat the latch member responsive to manipulation of the lever releases the lid, if the lid were in the closed position.

2. A system as defined in claim 1 wherein conditionable means comprises a cam movably mounted on the base, and wherein the lid latch means comprises:
   a plate pivotally mounted on the base for movement between (1) a protruding position, and (2) a retracted position; a first tab secured to the plate for (a) engagement with a lip provided in the lid when the plate is in the protruding position, and (b) releasing the lip when the plate is in the retracted position, if the lid were closed; a second tab secured to the plate for engagement with one end of a slide member reciprocably mounted on the base, the second end of the slide member being subject to engagement with the release lever, and means for biasing the plate in the protruding position.

3. A system as defined in claim 2 wherein the cam (1) blocks the manipulation of the lid release lever when it is in the first condition, and (2) frees the manipulation of the lever when it is in the second condition.

4. A system as defined in claim 3 further including means for biasing the cam in the first condition, whereby when the housing is in the playback mode manipulation of the lever is ineffective to release the lid.

5. A system as defined in claim 2 wherein the interconnecting means comprises:
   a hub pivotally mounted in the base;
   a pin secured to the hub and subject to engagement with the housing as the housing travels from the playback mode to the standby mode thereby rotating the hub;
   a cord interconnecting the cam and the hub; and
   guide means mounted on the base for guiding the cord such that rotation of the hub causes the cam to move to the second condition.

6. A system as defined in claim 1 further including a turntable brake mechanism comprising:
a plunger reciprocably mounted in the base for movement between (1) a first position when the lid is released open, and (2) a second position when the lid is closed, in response to the lid movement;
means for biasing the plunger in the first position; and
a friction pad secured to one end of the plunger for engagement with the turntable when the plunger is in the first position thereby effecting braking of the turntable when the lid is opened while the turntable is rotating.

7. In a playback system for recovering prerecorded signals by a signal pickup from a disc record rotatably mounted on a turntable, the playback system including a lid pivoted on a base for movement between a closed position and a released position, and a signal pickup housing reciprocably mounted on the base for travel between a standby mode and a playback mode, a lid interlock apparatus comprising:
a lid release lever movably mounted on the base;
a lid latch member for selectively releasing the lid in response to manipulation of the release lever, the latch member comprising: a plate pivotally mounted on the base for movement between (1) a protruding position, and (2) a retracted position; a first tab secured to the plate for (a) engagement with the lip provided in the lid when the plate is in the protruding position, and (b) releasing the lip when the plate is in the retracted position, if the lid were closed; a second tab secured to the plate for engagement with one end of a slide member reciprocably mounted on the base, and means for biasing the plate in the protruding position;
a cam mounted on the slide member for movement between (a) a first condition intercoupling, and (b) a second condition decoupling, the release lever and the slide; and wherein when the cam is in the second condition the latch member structure does not obstruct movement of the release lever; and
means interconnecting the cam and the signal pickup housing, wherein the interconnecting means is effective for moving the cam (one) into the first condition when the housing is in the standby mode whereat the latch member plate responsive to the movement of the slide member caused by manipulation of the lever releases the lid, and (two) into the second condition when the housing is in the playback mode whereat manipulation of the release lever is ineffective to release the lid, if the lid were closed.

8. A system as defined in claim 7 wherein the interconnecting means comprises:
a hub pivotally mounted in the base;
a pin secured to the hub and subject to engagement with the housing as the housing travels from the playback mode to the standby mode thereby rotating the hub;
a cord interconnecting the cam and the hub; and
guide means mounted on the base for guiding the cord such that rotation of the hub causes the cam to move to the first condition.

9. A system as defined in claim 8 further including a turntable brake mechanism comprising:
a plunger reciprocably mounted in the base for movement between (1) a first position when the lid is released open, and (2) a second position when the lid is closed, in response to the lid movement;
means for biasing the plunger in the first position; and
a friction pad secured to one end of the plunger for engagement with the turntable when the plunger is in the first position thereby effecting braking of the turntable when the lid is opened while the turntable is rotating.

* * * * *